United States Patent
van Dok et al.

(10) Patent No.: US 10,168,171 B2
(45) Date of Patent: Jan. 1, 2019

(54) APPARATUS AND METHODS OF DETERMINING PATHS THROUGH AN ELECTRONIC MAP

(71) Applicant: TomTom Navigation B.V., Amsterdam (NL)

(72) Inventors: Cornelis Klaas van Dok, Kudelstaart (NL); Jeroen Razoux Schultz, Amsterdam (NL); Bram Jan Jacobus van der Vlist, Eindhoven (NL); Ewgenij Gawrilow, Berlin (DE)

(73) Assignee: TOMTOM NAVIGATION B.V., Amsterdam (NL)

( * ) Notice: Subject to any disclaimer, the term of this patent is extended or adjusted under 35 U.S.C. 154(b) by 0 days.

(21) Appl. No.: 15/033,256

(22) PCT Filed: Oct. 30, 2014

(86) PCT No.: PCT/EP2014/073398
§ 371 (c)(1),
(2) Date: Apr. 29, 2016

(87) PCT Pub. No.: WO2015/063237
PCT Pub. Date: May 7, 2015

(65) Prior Publication Data
US 2016/0245663 A1    Aug. 25, 2016

Related U.S. Application Data

(60) Provisional application No. 61/898,468, filed on Oct. 31, 2013.

(51) Int. Cl.
*G01C 21/16*    (2006.01)
*G01C 21/34*    (2006.01)
*G01C 21/36*    (2006.01)

(52) U.S. Cl.
CPC ....... *G01C 21/3484* (2013.01); *G01C 21/165* (2013.01); *G01C 21/343* (2013.01);
(Continued)

(58) Field of Classification Search
CPC ............ G01C 21/3484; G01C 21/3676; G01C 21/3664; G01C 21/3492; G01C 21/165;
(Continued)

(56) References Cited

U.S. PATENT DOCUMENTS 5,559,707 A * 9/1996 DeLorme ............... G01C 21/20
340/990
7,403,483 B2 * 7/2008 Umezawa ............... H04L 45/00
370/238
(Continued)

FOREIGN PATENT DOCUMENTS

CN    102483333 A    5/2012
CN    102612709 A    7/2012
(Continued)

OTHER PUBLICATIONS

International Search Report of International Application No. PCT/EP2014/073398 dated Jan. 30, 2015.

*Primary Examiner* — Michael J Zanelli

(57) ABSTRACT

A plurality of routes through a navigable network represented by an electronic map are stored by a navigation device. Each route is defined as a plurality of point locations to be travelled between in a predefined order. The device receives a selection of one of the plurality of stored routes from a user, and determines a minimum cost path along segments of the electronic map between the plurality of point locations of the selected route. The minimum cost path traverses the plurality of point locations in an order based on the predefined order associated with the selected route. The
(Continued)

device then outputs a set of navigation instructions to the user for guiding the user along the route.

19 Claims, 5 Drawing Sheets

(52) U.S. Cl.
CPC ..... G01C 21/3476 (2013.01); G01C 21/3492 (2013.01); G01C 21/3605 (2013.01); G01C 21/3664 (2013.01); G01C 21/3676 (2013.01)

(58) Field of Classification Search
CPC .............. G01C 21/343; G01C 21/3605; G01C 21/3476; G01C 21/3453; G06Q 10/047
See application file for complete search history.

(56) References Cited

U.S. PATENT DOCUMENTS

| | | | |
|---|---|---|---|
| 7,555,382 B2 | 6/2009 | Chao | |
| 8,682,576 B2 | 3/2014 | Kurtti et al. | |
| 9,194,715 B2* | 11/2015 | Yang | G01C 21/3626 |
| 9,200,916 B2* | 12/2015 | Yoshida | G01C 21/343 |
| 2002/0107635 A1* | 8/2002 | Katayama | G01C 21/34 |
| | | | 701/467 |
| 2005/0222759 A1 | 10/2005 | Chao | |
| 2010/0145601 A1 | 6/2010 | Kurtti et al. | |
| 2011/0035143 A1* | 2/2011 | Lee | G06Q 10/06 |
| | | | 701/532 |
| 2012/0158301 A1* | 6/2012 | Schilling | H03M 7/40 |
| | | | 701/533 |

FOREIGN PATENT DOCUMENTS

| | | |
|---|---|---|
| CN | 102947676 A | 2/2013 |
| EP | 0572129 A1 | 12/1993 |
| EP | 1813914 A2 | 8/2007 |
| JP | H06258089 A | 9/1994 |
| JP | H09184733 A | 7/1997 |
| JP | H10089996 | 10/1998 |
| JP | 2001221647 A | 8/2001 |
| JP | 2006521033 A | 9/2004 |
| JP | 2011209292 A | 10/2011 |

* cited by examiner

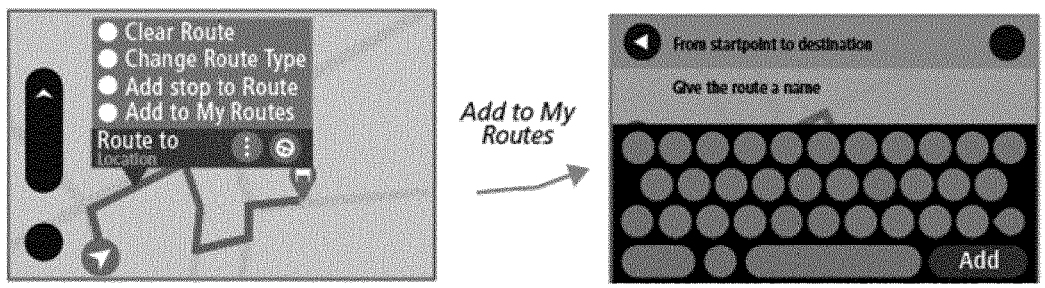
Figure 6
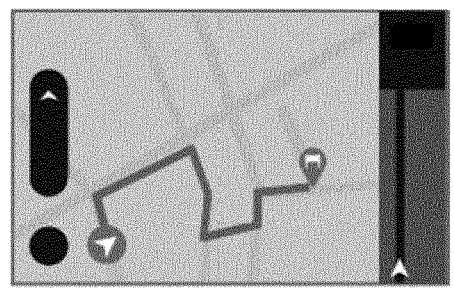
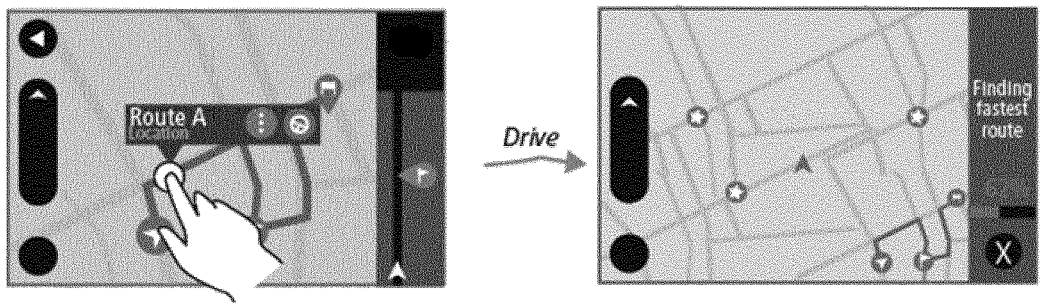
Figure 7
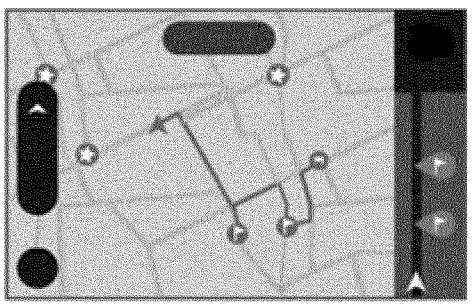

APPARATUS AND METHODS OF DETERMINING PATHS THROUGH AN ELECTRONIC MAP

The present application is the National Stage of International Application No. PCT/EP2014/073398, filed Oct. 30, 2014 and designating the United States, which claims benefit to U.S. Patent Application 61/898,468 filed on Oct. 31, 2013. The entire content of these applications is incorporated herein by reference.

SUMMARY

This invention relates to methods and systems for determining paths through an electronic map, and specifically methods for storing, retrieving, and editing routes for use in determining paths through an electronic map. Illustrative embodiments of the invention relate to portable navigation devices (so-called PNDs), in particular PNDs that include means for determining their current position.

BACKGROUND

Portable navigation devices (PNDs) that include global navigation satellite systems (GNSS), e.g. global positioning system (GPS), signal reception and processing functionality are well known, and are widely employed as in-car or other vehicle navigation systems. It will be appreciated, that portable navigation devices may use other means to determine their location, such as using the mobile telecommunications, surface beacons or the like.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power, and optionally data signals, can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account historical, existing and/or predicted traffic and road information.

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, an on-line route planning and navigation facility is provided at routes.tomtom.com, which facility allows a user to enter a start point and a destination, whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide, the route selection process, for example by specifying that certain routes, roads, locations or criteria are to be avoided or are mandatory for a particular journey. The route calculation aspect of the PND forms one primary function, and navigation along such a route is another primary function.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above provide a reliable means for enabling users to navigate from one position to another.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of the current road and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

As mentioned above, it is known for a user to use their navigation device to determine a route from a current position or other selected starting location to a desired destination location. The destination location may a location previously input and stored by the user on the device, e.g. a point of interest (POI) frequently used by the user, such as the location of the user's home, work, sports club, etc. A user may, however, frequently travel between a plurality of locations, e.g. a salesman or delivery man may make the same multiple stops on a regular basis, and a commuter may commonly make the same one or more stops on their way between home and work, and it would therefore be desirable to provide a way by which the user can quickly and easily plan a route between these plurality of locations without needing to individually select the starting and destination locations and typically one or more waypoints each time.

SUMMARY OF THE INVENTION

In accordance with a first aspect of the invention there is provided a method of generating a minimum cost path through a navigable network, the navigable network being represented by an electronic map comprising a plurality of segments representing navigable segments of the navigable network, the method comprising:

receiving a selection of one of a plurality of stored routes, each of the stored routes being defined as a plurality of point locations to be travelled between in a predefined order;

determining a minimum cost path along segments of the electronic map between the plurality of point locations of the selected route, the minimum cost path traversing the plurality of point locations in an order based on the predefined order associated with the selected route.

Thus, in the present invention, a user is able to select one of a plurality of stored routes, and a minimum cost path is determined for the selected route. According a user can quickly select and determine a regularly travelled route.

The present invention extends to a device, preferably a navigation device, for carrying out a method in accordance with any of the aspects or embodiments of the invention herein described.

Thus, in accordance with a second aspect of the invention there is provided a device for generating a minimum cost path through a navigable network, the navigable network being represented by an electronic map comprising a plurality of segments representing navigable segments of the navigable network, the device comprising:

means for storing a plurality of routes, each of the stored routes being defined as a plurality of point locations to be travelled between in a predefined order;

means for receiving a selection of one of the plurality of stored routes; and means for determining a minimum cost path along segments of the electronic map between the plurality of point locations of the selected route, the minimum cost path traversing the plurality of point locations in an order based on the predefined order associated with the selected route.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

In general, the system of the present invention in any of its embodiments may be at least one processing device. The or a processing device may be a device of a mobile device, such as a navigation device, whether a PND or an integrated device, or may be a device of a server.

In the invention, a plurality of routes are stored, for example, in a memory of the device. Each of the stored routes, which have preferably previously been entered by the user, e.g. in the manner described below, comprises a plurality of point locations and data representing an order through which the plurality of point locations are to be traversed. The plurality of point locations comprise at least a starting location and a destination location, and preferably further comprise one or more intermediate locations (also referred to herein as "waypoints" or "stops").

In embodiments of the invention, one or more, and preferably all, of the stored routes are defined by the user. For example, a user may save a recently traversed route between a starting location and a destination location via first and second intermediate waypoints as one of the stored routes; the stored route being defined in this instance by four point locations data indicating the appropriate order of the point locations.

A user may change the order of the point locations defining a stored route. For example, a user may be shown an ordered list of the point locations on a display of the device, and can reorder the point locations in the list. The order of the point locations following this reordering step being stored as a new predefined order associated with the stored route; the new order replacing the previous order. In another example, the user may be shown a representation of the electronic map with icons indicating each of the point locations of a stored route, and the user can select each of the point locations in turn in the desired order, e.g. by touching each icon when the device comprises a touch screen display.

Similarly, a user may modify the point locations defining a stored route, For example, in addition or alternatively to changing the order through which the stored point locations should be traversed, a user may add or delete one or more point locations to the stored route. As will be appreciated, at least when adding a new point location to the route, the user will indicate the position of the new point location in the order associated with the route.

In embodiments, each of the routes is stored in association with an identifier, such as a name or number, that allows the user to select their desired route. The identifier may be input by the user, and may be modified as desired. The identifier is preferably used by the user to select the desired route from the plurality of stored routes.

In embodiments, a selected route may be modified, e.g. by the addition or deletion of one or more point locations and/or by reordering the point locations, after a minimum cost path has been determined. In such embodiments, the minimum cost path is recalculated taking account of the modifications that have been made to selected route.

The minimum cost path determined between the plurality of point locations may be a fastest route, shortest route, most ecological, etc, or any combination thereof as desired. The minimum cost path may be determined using any known method, such as one based on the Dijkstra method. The cost to be minimised when determining the minimum cost path may be predefined or may be selected by the user. The minimum cost path is determined along segments of an electronic map. The term "segment" as used herein takes its usual meaning in the art. A segment may be a navigable link that connects two nodes, or any portion thereof. While embodiments of the present invention are described with reference to road segments, it should be realised that the invention may also be applicable to other navigable segments, such as segments of a path, river, canal, cycle path, tow path, railway line, or the like. For ease of reference these are commonly referred to as a road segment, but any reference to a "road segment" may be replaced by a reference to a "navigable segment" or any specific type or types of such segments.

Typically, the determined minimum cost path will traverse the plurality of point locations in the predefined order associated with the selected route. In embodiments, however, and after a stored route has been selected, a user can indicate that a "reverse" route is desired to be determined. In the reverse route, the minimum cost path is determined so as to traverse the plurality of point locations in the inverse of the predefined order associated with the selected route.

In embodiments, the method comprises determining a current location of the device, and the step of determining a minimum cost path comprises determining a minimum cost path from the current location of the device to the first point location of the selected route and then on to the last point location of the selected route. As will be appreciated, when the minimum cost path is a reverse route, the first point location will correspond to the last point location, and vice versa. In some embodiments, however, when the current location of the device is determined to be within a predetermined distance of the first point location, e.g. within a 500 meter radius of the first point location, the current location is used in place of the first point location when determining the minimum cost path for the selected route. Thus, for example, when a user has parked his or her vehicle close to their home or work, the user is not routed to the actual location of their home or work.

As will be appreciated by storing a route as a plurality of ordered point locations, rather than a particular path along segments of the electronic map, and determining a minimum cost path traversing the point locations in the set order, then the minimum cost path can be different based on the traffic situation on the navigable network at the time of travel. For example, the minimum cost path can be determined taking account of traffic events on the network.

In some embodiments, one or more, and preferably each, of the stored routes are further defined by data indicative of a polyline (or "polyline data"), which provides an approximation of the path to be travelled between the plurality of point locations of the stored route (and preferably between each pair of consecutive point locations). As will be discussed in more detail below, the polyline data is preferably used in the determination of the minimum cost path, with the routing generation process (that determines the minimum cost path) favouring segments of the electronic map for inclusion in the determined path that are in greater proximity to the polyline. In these embodiments the minimum cost path will provide a path that, at least partially, reconstructs the path between the plurality of point locations as represented by the stored polyline.

The term "polyline" is used herein in its conventional sense. The polyline is defined by a series of points connected by (typically straight) line segments. The data indicative of the polyline may be indicative in any manner of the polyline, whether directly or indirectly. For example, the polyline data may comprise a list of the points (e.g. in the form of latitude and longitude coordinates) defining the polyline and/or data indicative of the line segments connecting the points. It will be appreciated that the points are indicative of locations between the locations defined by the plurality of point locations, i.e. are more closely spaced than the predefined point locations. The points of the polyline may be spaced between 20 and 100 meters apart; so as to optimum processing efficiency. In preferred embodiments of the invention, the polyline data consists of a sequence of points, e.g. coordinate pairs. In other embodiments, the polyline data can comprise a sequence of stretches that are encoded in a map agnostic manner, e.g. using location reference systems such as OpenLR™, AGORA-C and TPEG-ULR.

The polyline data for a stored route may be obtained in any suitable manner. For example, the polyline data may be based on a previously travelled path between the point locations, or be based on a user input indicative of a desired path to be travelled between the point locations. The user input may involve the user providing one or more indications on a display representation of the electronic map, e.g. by touch or by controlling a cursor, to select a region. The polyline may then be defined with reference to the selected region. In other words, the user can effectively draw a desired path to be travelled between the point locations on a representation of the electronic map using a touch sensitive display.

In embodiments, the polyline data is modified or renewed when a point location is added or removed from a stored route, or when the order in which the point locations are to be travelled between changes. For example, the existing polyline data can be deleted, and replaced with new polyline data, e.g. based on user input indicative of a desired path between the modified point locations.

In embodiments using polyline data, the step of determining a minimum cost path comprises favouring segments of the electronic map for inclusion in the generated route that are in greater proximity to the polyline as represented on the electronic map. In other words, the segments that are relatively closer to the polyline as represented on the electronic map are favoured in the route generation process over those segments which relatively further from the polyline as represented on the electronic map. In this way, those segments which are in greater proximity to the polyline, i.e. relatively closer to the polyline than other segments of the electronic map, are more likely to be included in the generated route. It will be appreciated that references herein to segments of the electronic map being closer to or further from the polyline refer to the segments being closer to or further from the polyline as represented on the electronic map if not explicitly stated.

By favouring those segments which are in proximity to the polyline, the resulting generated path will be attracted toward the polyline. However, the generated path is not forced to be identical to the polyline. Thus, the segments are caused to be treated more favourably by a routing engine than those which are in lesser proximity to the polyline. The segments may be favoured by applying a positive weighting factor to the segments and/or by penalising those segments that are in lesser proximity to the polyline as represented on the electronic map. This may be achieved by appropriate manipulation of the cost associated with the segments that is used in route generation, i.e. the cost of traversing a segment (after applying the cost function used by the routing engine) is modified, typically reduced, such that the segment is favoured more by the routing engine than would normally be the case; this will be described in more detail below.

It will be appreciated that the segments are favoured relative to other segments of the electronic map based upon their proximity to the polyline, and without taking into account any other preferences and/or constraints imposed on the routing process. In the route generation process, proximity to the polyline is only one of a number of factors that may be taken into account. For example, as is known in the art, factors such as length of segments, transit times for segments, congestion likelihood, etc may be taken into account. Thus it is not necessarily the case that a segment closer to the polyline will always be more likely to be included in the route than an alternative one further away when all relevant factors are accounted for. It is this that provides the invention with the flexibility to provide a reconstructed route that is generally attracted to the polyline, while having the ability to deviate therefrom if appropriate, e.g. if a segment along or close to the polyline is closed or affected by congestion. It will be appreciated that the segments that are favoured or, in some cases, penalised in accordance with the invention are those segments which are considered for the purposes of the route generation.

Preferably a navigable segment is penalised to an extent that is based on a distance between the navigable segment and the polyline as represented on the electronic map. Thus, a penalty factor applied to the segment may be determined based on the distance between the navigable segment and the represented polyline. The degree to which a navigable segment is penalised is greater, the greater the distance between the navigable segment and the polyline as represented on the electronic map. Thus the penalty factor will be greater, the greater the distance between the navigable segment and the polyline. The degree to which a navigable segment is penalised may be proportional to a distance between the navigable segment and the polyline as represented on the electronic map, and most preferably to a square or higher order power of the distance.

The penalty factor applied to a segment, or the degree to which the segment is penalised, may take into account variation in the distance between the segment and the representation of the polyline along its length. For example, the penalty may be based upon an average distance between the segment and the polyline. This may be achieved in any suitable manner. In some preferred embodiments a segment is penalised to a degree that takes into account the distances between each of a plurality of different positions along the segment, and the representation of the polyline. In some preferred embodiments penalty factors are determined for each of a plurality of different positions along the segment, each being based upon the distance between the segment at the respective position and the representation of the polyline. The method may comprise determining a penalty factor for each of a plurality of positions along the segment, the penalty factor for each position being based upon a distance between the respective position and the polyline as represented on the electronic map, and using each penalty factor to derive an overall penalty factor to be applied to the navigable segment. The penalty factor for the segment may be obtained by combining penalty factors determined for each of the plurality of positions along the segment. For example, the penalty factors for each of the positions may be summed. Any reference to a position along the navigable segment may be in relation to the position along the actual navigable segment represented by the electronic map, or an approximation thereof. Where multiple positions along a navigable segment are taken into account, the spacing of the positions may be chosen as desired to provide a balance between accuracy in results and processing time and power required. For example, a closer spacing may be required where the segment has a more complex shape, e.g. as described using one or more shape points.

It will be appreciated that for processing efficiency, an approximation of the segment may be used to indicate the general position of the segment, e.g. ignoring detailed shape points along the length of the segment. Thus the distance between a navigable segment and the representation of the polyline may be based upon a distance between an approximation of the navigable segment and the representation of the polyline. For example, a navigable segment may be approximated by a straight line connecting the end nodes of the segment. In some embodiments a decision as to whether to use an approximation of the navigable segment or the actual course of the navigable segment when determining the distance may depend upon a complexity of a shape of the navigable segment and/or its relationship to the polyline. In these circumstances use of an approximation of the course of the navigable segment may be more likely to result in inaccurate determinations for the distance between the segment and the polyline. For example, where the projection of positions along a navigable segment on to the polyline extend over more than one segment of the polyline, intermediate shape points of the navigable segment may be taken into account.

In the preferred embodiments in which a segment is penalised to an extent that is based upon the distance between the segment and the polyline, the polyline may act as a magnet, drawing the generated route back toward the representation of the polyline, but with a degree of attraction that increases with distance from the polyline. Thus, segments at a greater distance from the polyline will be penalised to a greater extent from those that are closer.

The path generated through the navigable network may be generated in a standard manner, e.g. using a conventional routing engine, but additionally taking into account the polyline data. Thus, usual route planning preferences or settings may be retained, with the polyline data providing an additional input that is used, for example, to result in segments closer to the polyline being favoured over those further away.

In preferred embodiments in which segments that are in greater proximity to the polyline are favoured for the purposes of route generation, the segments are preferably favoured by manipulation of the respective costs associated with traversing the segments of the network that are considered during route generation. This may be achieved by providing the segments that are favoured with a relatively lower cost than other segments at least in relation to a cost factor for the segment that is based on the proximity of the segment to the polyline and/or penalising other segments by providing them with a higher cost at least in relation to a cost factor for the segment that is based on the proximity of the segment to the polyline. In the preferred embodiments described above in which segments are penalised by applying a penalty factor thereto, the penalty factor is preferably used to provide a cost factor associated with traversing the segment that is taken into account in route generation, and which is based on the proximity of the segment to the polyline. Preferably the greater the penalty factor, the greater the cost factor based thereon. The penalty factor may be used directly or indirectly in providing the cost factor for traversing the segment that is based on the proximity of the segment to the polyline. The cost factor based on proximity of a segment to the polyline may be used in obtaining an overall cost for traversing the segment that is used in the route generation process, e.g. to obtain a least cost route. The cost factor may be used in a cost function to provide the overall cost for traversing the segment. Preferably the cost factor is one of a plurality of cost factors associated with the navigable segment that are used to obtain the overall cost for traversing the segment. In this way, route generation may balance the proximity of segments to the polyline with other factors to obtain a route that generally corresponds to the polyline, but which may also take into account other preferences, etc. The other cost factor(s) associated with segments are based upon one or more attributes of the segments. Attributes associated with segments which may be taken into account include the length, transit time, average speed of traversal, curvature or fuel consumption of the segments.

In embodiments, the method further comprises providing navigation instructions to a user to guide a user along the determined minimum cost path. The navigation instructions may be in the form of a display of the route, typically in combination with a set of one or more instructions indicative of, e.g. manoeuvres and other action to be taken by the user to follow the route, which may be given audibly and/or visually.

Any of the methods in accordance with the present invention may be implemented at least partially using software, e.g. computer programs. The present invention thus also extends to a computer program comprising computer readable instructions executable to perform, or to cause a device, e.g. navigation device and/or server, to perform a method according to any of the aspects or embodiments of the invention.

The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Regardless of its implementation, a device, e.g. navigation apparatus, used in accordance with the present invention may comprise a processor, memory, and digital map data (or electronic map) stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include global navigation satellite system (GNSS), e.g. GPS or GLONASS, signal reception and processing functionality. As will be appreciated the navigation apparatus may use other means for determining its current location as desired, e.g. terrestrial beacons, the mobile telecommunications network, etc. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In other embodiments, the navigation apparatus may be implemented at least in part by means of an application of a processing device which does not form part of a specific navigation device. For example the invention may be implemented using a suitable computer system arranged to execute navigation software. The system may be a mobile or portable computer system, e.g. a mobile telephone or laptop, or may be a desktop system.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

Advantages of these embodiments are set out hereafter, and further details and features of each of these embodiments are defined in the accompanying dependent claims and elsewhere in the following detailed description.

BRIEF DESCRIPTION OF THE FIGURES

Embodiments of the invention will now be described, by way of example only, with reference to the accompanying Figures, in which:

FIGS. 5 to 8 illustrate steps of a method in accordance with an embodiment of the invention.

DETAILED DESCRIPTION OF THE FIGURES

Embodiments of the present invention will now be described with particular reference to a Portable Navigation Device (PND). It should be remembered, however, that the teachings of the present invention are not limited to PNDs but are instead universally applicable to any type of processing device that is configured to execute navigation software in a portable manner so as to provide route planning and navigation functionality. It follows therefore that in the context of the present application, a navigation device is intended to include (without limitation) any type of route planning and navigation device, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

Further, embodiments of the present invention are described with reference to a road network. It should be realised that the invention may also be applicable to other navigable networks, such as pedestrian paths, rivers, canals, cycle paths or the like.

Figure 1:
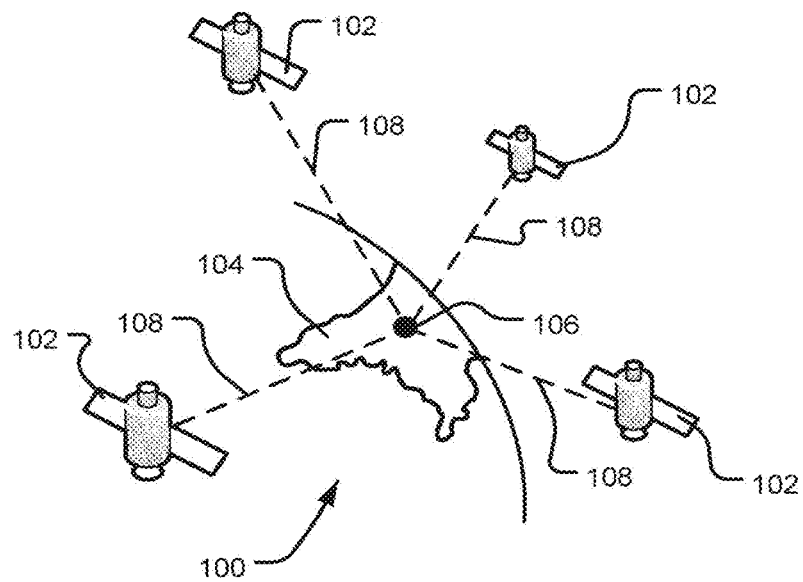
FIG. 1 is a schematic illustration of an exemplary part of a Global Positioning System (GPS) usable by a navigation device.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives GPS data as spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
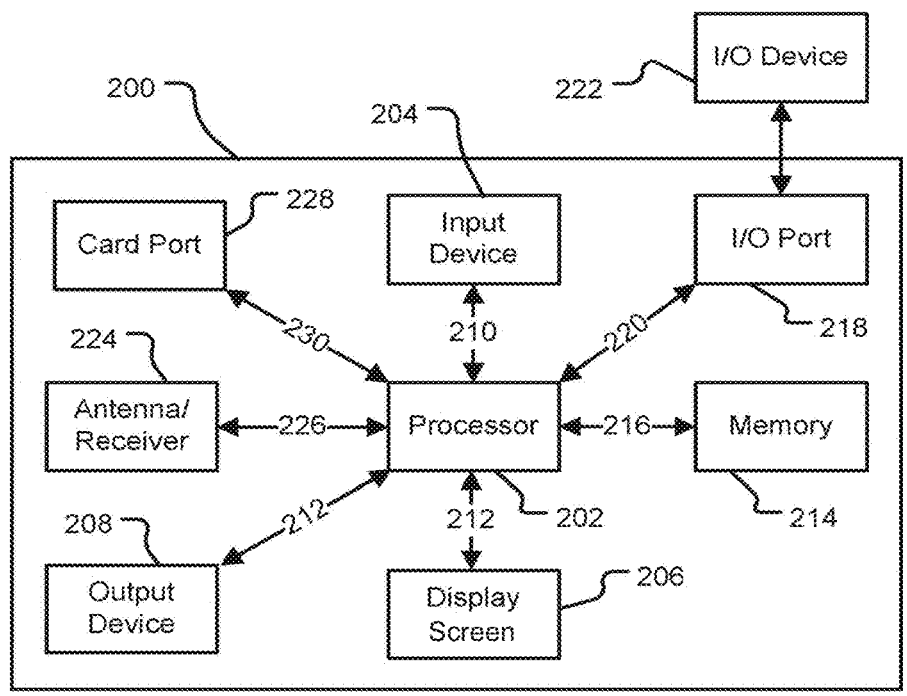
FIG. 2 is a schematic illustration of electronic components of a navigation device.

An exemplary navigation device 200, e.g. PND, is shown in FIG. 2; it should be noted that the block diagram of the navigation device 200 is not inclusive of all components of the navigation device, but is only representative of many example components. The navigation device 200 is located within a housing (not shown). The navigation device 200 includes processing circuitry comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, the input device 204 and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

Figure 3:
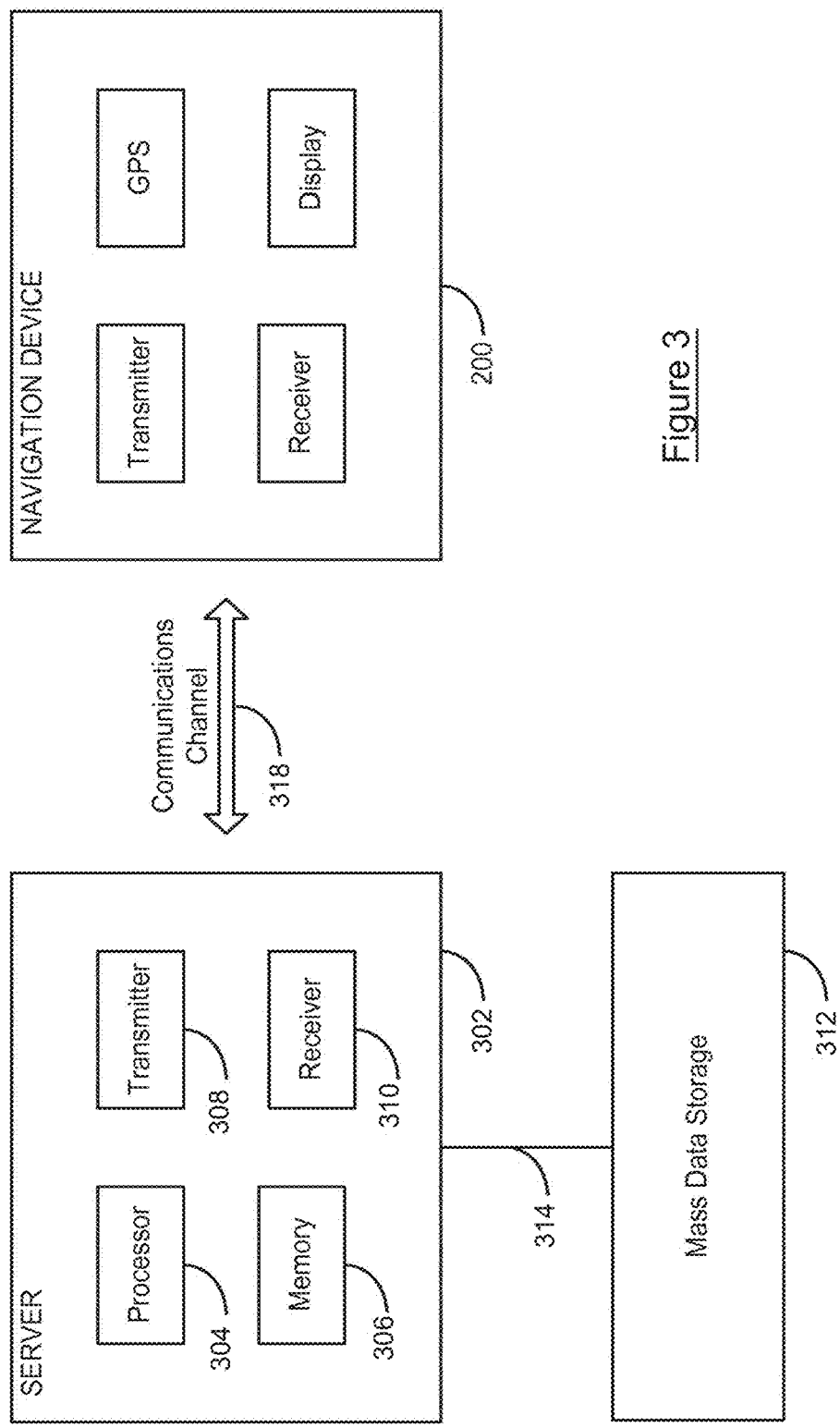
FIG. 3 is a schematic diagram of a communications system for communication between a navigation device and a server.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology). Thereafter, through its network service provider, the mobile device can establish a network connection (through the internet for example) with the server 302. As such, the "mobile" network connection is established between the navigation device 200 (which can be, and often times is mobile as it travels alone and/or in a vehicle) and the server 302 to provide a "real-time" or at least very "up to date" gateway for information.

In FIG. 3, the navigation device 200 is depicted as being in communication with the server 302 via a generic communications channel 318 that can be implemented by any of a number of different arrangements. The server 302 and navigation device 200 can communicate when a connection via communications channel 318 is established between the server 302 and the navigation device 200 (noting that such a connection can be a data connection via mobile device and a direct connection via personal computer via the Internet).

The server 302 includes, in addition to other components which may not be illustrated, a processor 304 operatively connected to a memory 306 and further operatively connected, via a wired or wireless connection 314, to a mass data storage device. The processor 304 is further operatively connected to a transmitter 308 and a receiver 310, to transmit and receive information to and from navigation device 200 via communications channel 318, respectively. The signals sent and received may include data, communication, and/or other propagated signals. The transmitter 308 and receiver 310 may be selected and/or designed according to a communications requirement and communication technology used in the communication design for the navigation system 200. Further, it should be noted that the functions of the transmitter 308 and receiver 310 may be combined into a signal transceiver.

The server 302 is further connected to (or includes) the mass storage device 312. The mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through a communications channel 318, and includes the processor 202 and the memory 214, as previously described with regard to FIG. 2, as well as a transmitter and receiver 224 to send and receive signals and/or data through the communications channel 318, noting that these devices can further be used to communicate with devices other than server 302. Further, the transmitter and receiver 224 are selected or designed according to communication requirements and communication technology used in the communication design for the navigation device 200 and the functions of the transmitter 320 and receiver 322 may be combined into a single transceiver.

Software stored in the memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communications channel 318 generically represents a propagating medium or path that connects the navigation device 200 and the server 302. Both the server 302 and navigation device 200 include transmitters for transmitting data through the communication channel 318 and receivers for receiving data that has been transmitted through the communications channel 318.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

The memory 214 of the navigation device 200 comprises a portion of non-volatile memory (for example to store program code) and a portion of volatile memory (for example to store data as the program code is executed). The navigation device also comprises a port 228, which communicates with the processor 202 via connection 230, to allow a removable memory card (commonly referred to as a card) to be added to the device 200.

FIG. 2 further illustrates an operative connection between the processor 202 and an antenna/receiver 224 via connection 226, wherein the antenna/receiver 224 can be a GPS antenna/receiver for example and as such would function as the GPS receiver 106 of FIG. 1. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 2 are powered by one or more power sources (not shown) in a conventional manner. Such power sources may include an internal battery and/or a input for a low voltage DC supply or any other suitable arrangement. As will be understood by one of ordinary skill in the art, different configurations of the components shown in FIG. 2 are contemplated. For example, the components shown in FIG. 2 may be in communication with one another via wired and/or wireless connections and the like. Thus, the navigation device 200 described herein can be a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use. Indeed, in other embodiments, the device 200 may be arranged to be handheld to allow for navigation of a user.

Figure 4:
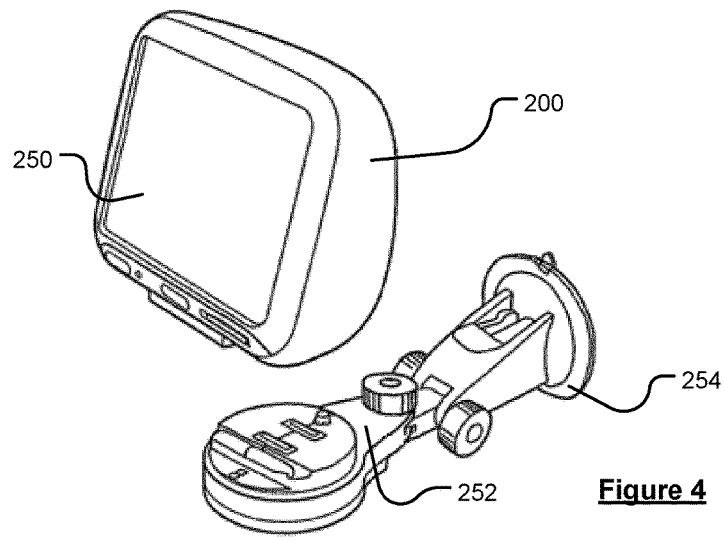
FIG. 4 is a schematic diagram of an arrangement of mounting and/or docking a navigation device.

Referring to FIG. 4, the navigation device 200 may be a unit that includes the integrated input and display screen 206 and the other components of FIG. 2 (including, but not limited to, the internal GPS receiver 224, the processor 202, a power supply (not shown), memory systems 214, etc.). The navigation device 200 may sit on an arm 252, which itself may be secured to a vehicle dashboard/window/etc. using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

Various embodiments of the present invention will now be described with reference to FIGS. 5 to 8.

Embodiments of the invention provide users the option to save an active or planned route; it enables users to store, retrieve, edit and drive routes. A route is a collection of defined points: starting point, destination and optionally one or more stops (waypoints). Every time a user selects a stored "route" to drive, the device calculates a minimum cost path, e.g. fastest route or other route type. The invention is preferably targeted at three types of users: (i) the salesman, who uses itineraries with multiple stops on a daily basis—the routes are prone to change and this user needs a flexible way to edit the order of stops or deviate from a planned route; (ii) the tourist, who occasionally creates itineraries to and around a holiday location—typically multiple stops are defined, mostly based on POI's and scenic roads; and the commuter, who wants to add one or two stops in between their home and work location, as a regular commute detour.

Figure 5:
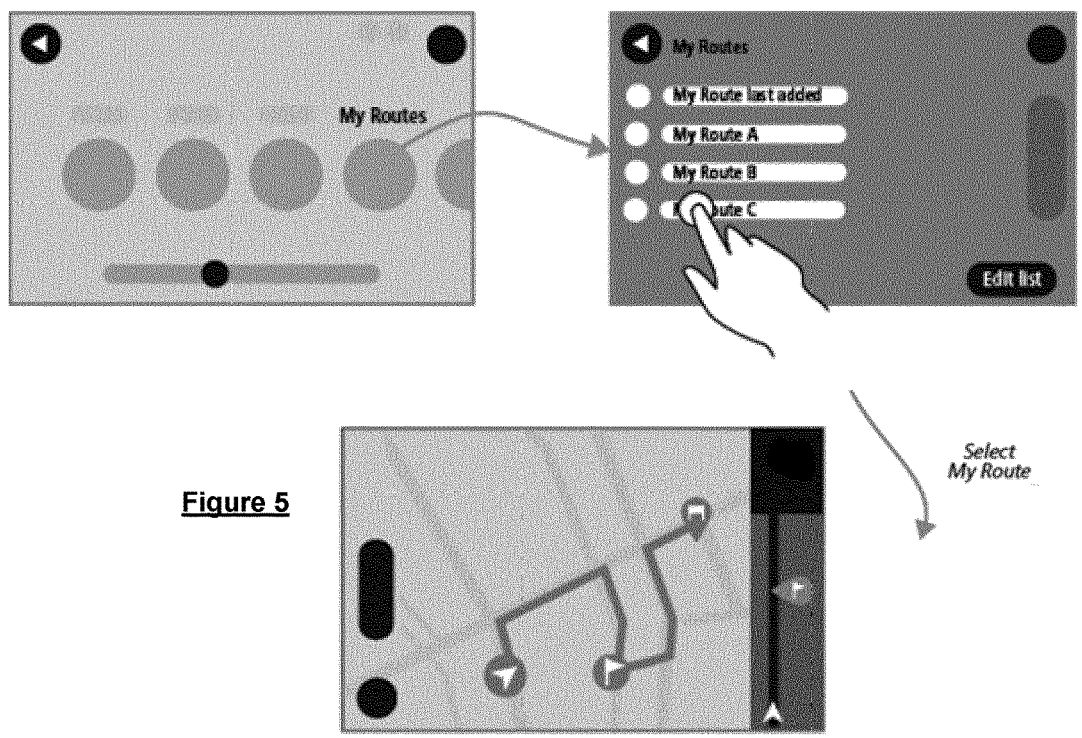

In FIG. 5, a user is shown selecting the relevant item on a main menu, and displaying a list showing each stored route. When one of the stored routes is selected, e.g. by the user touching a graphical icon associated with the stored route, a minimum cost path is determined for the route through the defined points.

FIG. 6 shows how a user can create a route using a displayed map. In the first screen, when a route item is tapped (not any of the points on that route), the contextual menu for a route item appears. It contains the command 'Add to My Routes'. When "Add to My Routes" is tapped, the second screen appears. A keyboard is opened to change the default name into a user defined name. When the 'Add' command is selected, a minimum cost path is determined and displayed on a map (third screen).

FIG. 7 shows a method of navigating to a selected route. In this case, a stored route "Route A" is selected, and a minimum cost path is determined from the current position of the device to the start of the stored route. When the start of the stored route is located within a range, e.g. 500 meters, from the current position, the start point is ignored and the minimum cost path is calculated from the current position to the next stop in the stored route.

Figure 8:
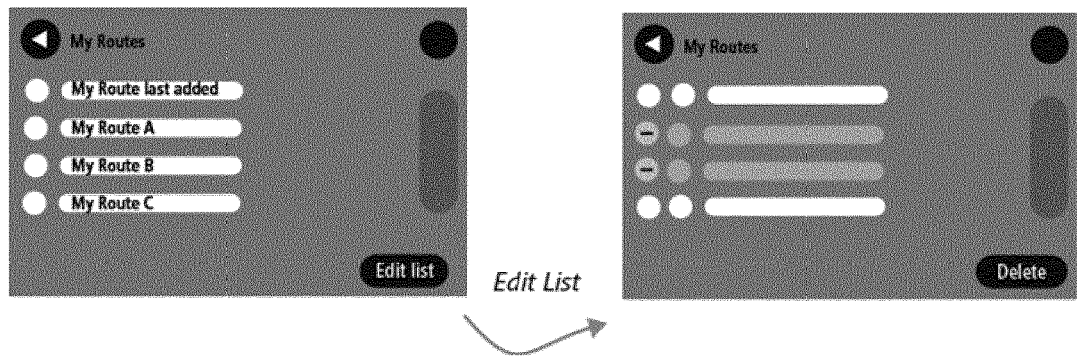

FIG. 8 shows a user interface for editing stored routes. When the 'Edit list' command is touched for a selected route, then the user is able to delete the route, rename the route, modify the route and/or reorder the points of the route. The route can be modified, for example, by adding or deleting one or more stops from the route. A stop can be added to a route by touching a location on a displayed map.

In some embodiments, a stored route may be defined by polyline data in addition to the data indicative of a collection of predefined points. Such polyline data may be used in the determination of the minimum cost path, such that the determined minimum cost path attempts to reconstruct the route between the predefined points in accordance with the polyline data. The polyline data therefore allows a user to store a route, not only as locations to be visited, but also with an indication of their preference for the path to be taken between the locations.

The polyline data is in the form of a plurality of points connected by lines. For example, the data may be in the form of an ordered list identifying the points which are connected by the line segments in the polyline. The points may be defined in terms of latitude and longitudinal coordinates. The points may be spaced between 20 and 100 meters apart; so as to optimum processing efficiency. The polyline may take over forms, such a series of connected line segments, or as an ordered list of distances and bearings from a starting location (with each distance and bearing indicating the next line segment of the polyline).

The polyline need not exactly replicate the route. The polyline may be a generalisation of the route. For example, the number of points in the polyline may be reduced compared to a number of points between segments of the route that it represents, and/or initial polyline data may be subjected to a generalisation process to reduce the number of points, e.g. coordinates it includes. Thus the polyline is representative of the route in that it is at least similar thereto, and may be an approximation of the route.

Reconstruction of the route indicated by the polyline data may involve favouring segments of the electronic map closer to the polyline, e.g. by lowering the cost associated with the segments, so that the minimum cost path generated will tend to follow the polyline. The way in which segments of an electronic map closer to the representation of the polyline on the map may be favoured in route reconstruction in accordance with certain embodiments of the invention will now be described A penalty factor is applied to segments considered in the route (or graph) search algorithm dependent upon their distance from the polyline. The greater the distance between a segment and the polyline, the greater the penalty factor applied to the segment. The penalty factor gives rise to a cost attributable to the distance of the segment from the polyline which is taken into account when determining a least cost route through the network between the origin and destination, with a higher penalty factor for a segment resulting in a higher cost contribution. In this way, when generating a route, the route will tend to conform to the general form of the polyline. Furthermore, if a vehicle deviates from the reconstructed route, i.e. the recommended route, and it is necessary to regenerate a route to return the vehicle to the recommended route, the level of "attraction" pulling the vehicle back to the recommended route close to the polyline will increase, the further the vehicle moves from the recommended route.

One example of the way in which penalty factors may be applied to segments of an electronic map dependent upon their distance from the polyline as represented on the map during route reconstruction will now be described in more detail.

The method is used to determine a penalty factor that is associated with a contribution to the cost of traversing a navigable segment during the usual route generation process e.g. to provide a least cost route through the network between the origin and destination. The penalty factor, and hence the cost contribution, is attributable to, and dependent upon, a distance between the navigable segment and the polyline. This will provide a contribution to the cost of traversing the segment according to the cost function that is used. Other contributions to the cost may be based upon any other factors that are desired to be taken into account, e.g. travel time for traversing the segment, segment length, etc.

The penalty factor is obtained by consideration of a number of points along the length of the navigable segment, or an approximation thereof. For example, to simplify processing, a navigable segment may be treated as a straight line connecting its end points, such that intermediate shape points are ignored. In other arrangements intermediate shape points may be taken into account. For example, where more than one vertex of the polyline exists between the projection of the first and second ends of a navigable segment upon the polyline, intermediate shape points of the segment may be taken into consideration. This may help to ensure that the generated reconstructed route will tend to follow the polyline even where it makes a tight loop.

The following steps are performed for each point along the segment or approximation thereof that is considered. The point is projected onto the polyline. A penalty factor for that point is derived which is proportional to the square of the distance between the point and its projection on to the polyline. Of course, on other embodiments, the penalty factor may be proportional to the cube of the distance between the point and its projection onto the polyline, or to any other power as desired. An overall penalty factor for the segment is derived by summing the penalty factors associated with individual points along the length of the segment or approximation thereof. In preferred embodiments this is achieved by integration. This overall penalty factor is then used to provide a cost contribution based on the distance of the segment and the polyline for use in route generation.

In other words, during the route search, an additional "friction loss penalty" is added to the usual propagation cost on each arc (travel time, path length, etc depending on the objective function). The "friction loss" is calculated as an integral of the "friction force" over the arc, where the magnitude of the force is proportional to the square of the distance between the point on the arc and its projection on the prescribed polyline. You can think of a rubber string attached to a small carriage sliding on rails along the polyline. The further from the rails you are walking, the tighter becomes the string and the harder for you to walk.

Figure 9A:
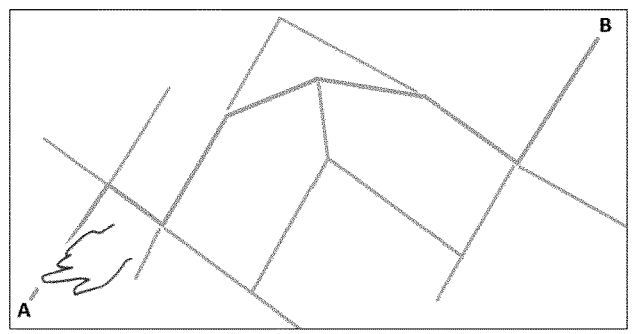
FIGS. 9A and 9B illustrate an exemplary method of determining polyline data for a stored route.
Figure 9B:
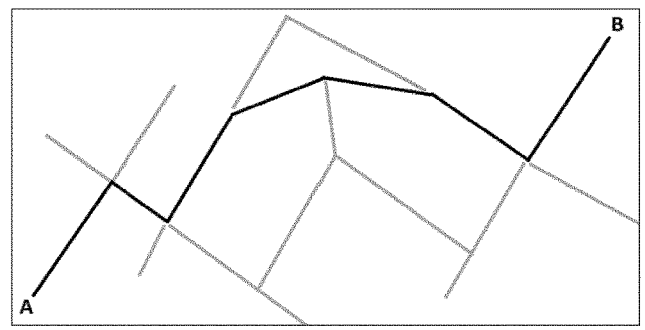

FIGS. 9A and 9B show an example of how the polyline data can be obtained. In FIG. 9A, a representation of an electronic map is shown on a touch sensitive display, and a user draws an indication of the route to be taken between points A and B. This drawn route is shown by the black lines in FIG. 9B, and the polyline data is defined based on this drawn route. In other embodiments, the polyline data can be determined based on previous journey made between points A and B.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

The invention claimed is:

1. A method of generating a minimum cost path through a navigable network, the navigable network being represented by an electronic map comprising a plurality of segments representing navigable segments of the navigable network, the method comprising:
   receiving a selection of one of a plurality of stored routes, each of the stored routes being defined as a plurality of point locations to be travelled between in a predefined order and including data indicative of a polyline, the polyline representing a route between said point locations;
   determining a minimum cost path along segments of the electronic map between the plurality of point locations of the selected route, the minimum cost path traversing the plurality of point locations in an order based on the predefined order associated with the selected route, the determining comprising using the polyline data in determining the minimum cost path; and
   providing navigation instructions to a user to guide the user along the minimum cost path.

2. The method of claim 1, wherein the plurality of point locations include a starting location and a destination location, and one or more intermediate locations.

3. The method of claim 1, wherein one or more, and optionally all, of the stored routes are defined by a user.

4. The method of claim 1, wherein a user may change the order of the point locations defining a stored route and/or modify the point locations defining a stored route.

5. The method of claim 1, wherein each of the routes is stored in association with an identifier that allows a user to select their desired route, and wherein the user uses the identifier to select the desired route from the plurality of stored routes.

6. The method of claim 1, comprising determining a current location of the device, and wherein the determining a minimum cost path comprises determining a minimum cost path from the current location of the device to the first point location of the selected route and then on to the last point location of the selected route.

7. The method of claim 1, wherein a user, after a stored route has been selected, indicates that a reverse route is to be determined, the method comprising determining the minimum cost path so as to traverse the plurality of point locations in the inverse of the predefined order associated with the selected route.

8. The method of claim 1, wherein the minimum cost path is determined taking into account traffic events on the network.

9. The method of claim 1, wherein the determining a minimum cost path comprises favoring segments of the electronic map for inclusion in the determined path that are in greater proximity to the polyline as represented on the electronic map.

10. A device for generating a minimum cost path through a navigable network, the navigable network being represented by an electronic map comprising a plurality of segments representing navigable segments of the navigable network, the device comprising:
    a memory storing a plurality of routes, each of the stored routes being defined as a plurality of point locations to be travelled between in a predefined order and including data indicative of a polyline, the polyline representing a route between said point locations; and one or more processors arranged to:
receive a selection of one of the plurality of stored routes;
determine a minimum cost path along segments of the electronic map between the plurality of point locations of the selected route, the minimum cost path traversing the plurality of point locations in an order based on the predefined order associated with the selected route, the determining comprising using the polyline data in determining the minimum cost path; and
provide navigation instructions to a user to guide the user along the minimum cost path.

11. The device of claim 10, wherein the one or more processors are further arranged to:
receive an indication of a change in the order of the point locations in a specified stored route and/or a modification of the point locations in the specified stored route; and
make a corresponding change to or modification of the point locations in the specified stored route.

12. The device of claim 10, wherein the one or more processors are further arranged to:
determine a current location of the device, wherein the determining the minimum cost path comprises determining the minimum cost path from the current location of the device to a first point location of the selected route and then on to subsequent point locations of the selected route.

13. The device of claim 10, wherein the one or more processors are further arranged to:
receive an indication, after a stored route has been selected, that a reverse route is to be determined; and
determine the minimum cost path so as to traverse the plurality of point locations in an inverse of the predefined order associated with the selected route.

14. The device of claim 10, wherein the one or more processors are further arranged to:
take into account traffic events on the network when determining the minimum cost path.

15. A non-transitory computer readable medium comprising instructions which, when executed by at least one processor of a computing device, cause the computing device to perform a method of generating a minimum cost path through a navigable network, the navigable network being represented by an electronic map comprising a plurality of segments representing navigable segments of the navigable network, the method comprising:
receiving a selection of one of a plurality of stored routes, each of the stored routes being defined as a plurality of point locations to be travelled between in a predefined order and including data indicative of a polyline, the polyline representing a route between said point locations;
determining a minimum cost path along segments of the electronic map between the plurality of point locations of the selected route, the minimum cost path traversing the plurality of point locations in an order based on the predefined order associated with the selected route, the determining comprising using the polyline data in determining the minimum cost path; and
providing navigation instructions to a user to guide the user along the minimum cost path.

16. The non-transitory computer readable medium of claim 15, wherein the method further comprises:
receiving an indication of a change in the order of the point locations in a specified stored route and/or a modification of the point locations in the specified stored route; and
making a corresponding change to or modification of the point locations in the specified stored route.

17. The non-transitory computer readable medium of claim 15, wherein the method further comprises:
determining a current location of the device, wherein the determining the minimum cost path comprises determining the minimum cost path from the current location of the device to a first point location of the selected route and then on to subsequent point locations of the selected route.

18. The non-transitory computer readable medium of claim 15, wherein the method further comprises:
receiving an indication, after a stored route has been selected, that a reverse route is to be determined; and
determining the minimum cost path so as to traverse the plurality of point locations in an inverse of the predefined order associated with the selected route.

19. The non-transitory computer readable medium of claim 15, further comprising:
taking into account traffic events on the network when determining the minimum cost path.

\* \* \* \* \*